US011182266B2

(12) United States Patent
Della Corte et al.

(10) Patent No.: US 11,182,266 B2
(45) Date of Patent: Nov. 23, 2021

(54) DETERMINATION OF SUBJECT MATTER EXPERTS BASED ON ACTIVITIES PERFORMED BY USERS

(71) Applicant: INTERNATIONAL BUSINESS MACHINES CORPORATION, Armonk, NY (US)

(72) Inventors: Gianluca Della Corte, Rome (IT); Francesca Galeri, Rome (IT); Leonida Gianfagna, Rome (IT); Antonio M. Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 16/012,851

(22) Filed: Jun. 20, 2018

(65) Prior Publication Data
US 2019/0391895 A1    Dec. 26, 2019

(51) Int. Cl.
*G06F 9/44*     (2018.01)
*G06F 11/30*    (2006.01)
*G06F 11/34*    (2006.01)

(52) U.S. Cl.
CPC ........ *G06F 11/3065* (2013.01); *G06F 11/302* (2013.01); *G06F 11/3438* (2013.01)

(58) Field of Classification Search
None
See application file for complete search history.

(56) References Cited

U.S. PATENT DOCUMENTS 7,552,199 B2   6/2009   Pomerantz
9,317,574 B1   4/2016   Brisebois et al.
2005/0165780 A1   7/2005   Omega et al.
2006/0085750 A1   4/2006   Easton, Jr. et al.
2010/0169426 A1   7/2010   Dreyfus et al.
2010/0262610 A1   10/2010   Acosta et al.
(Continued)

FOREIGN PATENT DOCUMENTS

CN    1938681 A    3/2007

OTHER PUBLICATIONS

Disclosed Anonymously, "Automatic SME finder in Collaborative Applications", An IP.com Prior Art Database Technical Disclosure, IP.com No. IPCOM000209514D, IP.com Electronic Publication Date: Aug. 8, 2011, 5 pages.
(Continued)

*Primary Examiner* — Qamrun Nahar
(74) *Attorney, Agent, or Firm* — Michael A. Petrocelli (57) ABSTRACT

A method for determining subject matter experts includes monitoring, by a computer, an activity performed by a user during a period of time, the activity including a sequence of operations, based on the sequence of operations, determining a topic of the activity performed by the user, recognizing, by the computer, a hesitation pattern of the user associated with the topic during the period of time, based on the recognized hesitation pattern, calculating a confidence indicator associated with the activity, the confidence indicator specifies a confidence of the user in performing the activity, based on the confidence indicator being lower than a confidence threshold, identifying one or more subject matter experts for the determined topic, and prompting the user to submit a support request to at least one of the identified subject matter experts.

20 Claims, 6 Drawing Sheets

(56) References Cited

U.S. PATENT DOCUMENTS

| | | | |
|---|---|---|---|
| 2013/0231857 A1* | 9/2013 | Beaurepaire | G01C 21/20 |
| | | | 701/428 |
| 2014/0280243 A1 | 9/2014 | Lee et al. | |
| 2014/0280877 A1* | 9/2014 | Koulomzin | G06F 3/0481 |
| | | | 709/224 |
| 2015/0121219 A1* | 4/2015 | Baklanovs | G06F 11/3438 |
| | | | 715/712 |
| 2015/0347912 A1 | 12/2015 | Rodzevski | |
| 2016/0140186 A1* | 5/2016 | Langen | G06F 16/337 |
| | | | 707/723 |
| 2016/0308750 A1 | 10/2016 | Emejulu et al. | |
| 2017/0060873 A1 | 3/2017 | Rathod et al. | |

OTHER PUBLICATIONS

"Determining subject-matter expert for a collaborative reading environment", An IP.com Prior Art Database Technical Disclosure, IP.com No. IPCOM000241843D, IP.com Electronic Publication Date: Jun. 3, 2015, 5 pages.

International Search Report and Written Opinion, International Application No. PCT/IB2019/053928, International Filing Date May 13, 2019, 9 pages.

* cited by examiner

DETERMINATION OF SUBJECT MATTER EXPERTS BASED ON ACTIVITIES PERFORMED BY USERS

BACKGROUND

The present invention generally relates to information technology, and more particularly to a method, system and computer program product for determining subject matter experts.

Computing machines, or simply computers, are used to perform a large number of activities. For example, a user of a computer may prepare text documents using a word processor, financial reports using spreadsheets, multimedia presentations using a slideshow application, technical designs using CAD, software programs using an IDE application, and so on. In some instances the user may not be familiar with such applications and require additional help to perform a task.

SUMMARY

According to an embodiment of the present disclosure, a method for determining subject matter experts includes monitoring, by a computer, an activity performed by a user during a period of time, the activity including a sequence of operations, based on the sequence of operations, determining a topic of the activity performed by the user, recognizing, by the computer, a hesitation pattern of the user associated with the topic during the period of time, based on the recognized hesitation pattern, calculating a confidence indicator associated with the activity, the confidence indicator specifies a confidence of the user in performing the activity, based on the confidence indicator being lower than a confidence threshold, identifying one or more subject matter experts for the determined topic, and prompting the user to submit a support request to at least one of the identified subject matter experts.

According to another embodiment, a computer system for determining subject matter experts includes one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method including: monitoring, by a computer, an activity performed by a user during a period of time, the activity including a sequence of operations, based on the sequence of operations, determining a topic of the activity performed by the user, recognizing, by the computer, a hesitation pattern of the user associated with the topic during the period of time, based on the recognized hesitation pattern, calculating a confidence indicator associated with the activity, the confidence indicator specifies a confidence of the user in performing the activity, based on the confidence indicator being lower than a confidence threshold, identifying one or more subject matter experts for the determined topic, and prompting the user to submit a support request to at least one of the identified subject matter experts.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Every day numerous activities related to a wide variety of areas are performed using a computer machine (hereinafter "computer"). However, some of those activities can be difficult for unexperienced users. For example, an activity may require knowledge in different domains that may be unknown to the user, or the activity may be particularly specific and/or complex thereby becoming a challenge to the user. In these situations, the user may need help to perform the activity in a satisfactory manner. For this purpose, the user generally starts searching information about a corresponding topic. Nowadays, this is almost always performed on the Internet (by submitting corresponding queries to a search engine). However, the Internet search may not provide the desired results fast enough becoming a time-consuming task.

Consequently, the user may require the support of a subject matter expert (SME), or simply expert, which has a special knowledge of the topic. For example, a user working on a software project may need to contact an expert of a corresponding programming language, an expert of a corresponding hardware architecture, or an expert of a corresponding business field. However, the identification of the expert in any specific situation is not an easy task. For this purpose, the user generally searches the expert among the persons that are known to him/her (for example, colleagues, friends). This is very ineffective, since the known persons are intrinsically limited. Therefore, it is very likely that persons in a better position to help the user are missed.

Additionally, the subject matter expert(s) may be searched on the Internet either manually or automatically according to personal information publicly available. For example, the search may be based on social network profiles or online forums indicating education, jobs, publications of potential subject matter experts. However, the profiles may be not up-to-date, or the proclaimed skills in the profile may not correspond to actual competences. In any case, the definition of personal information is based on a subjective criteria, which is hardly homogeneous.

Therefore, the subject matter expert that is identified may not be capable of providing the required help to the user. In this case, the search for another subject matter expert has to be repeated one or more times (with the risk of never finding a suitable one). Often, the user realizes that he/she needs the support of an expert only after a relatively long time. In the meantime, the user does not manage to perform the required activity in a satisfactory and efficient manner since valuable time has been wasted searching for the required information (without success).

The situations described above have a detrimental effect on the user's productivity and general performance. Specifically, the unsuccessful Internet searches for the required information and subject matter expert, and the numerous communications over the Internet with persons that are not the required subject matter experts adversely affect the performance of a corresponding computing system since these operations require a large amount of computing resources (for example, computational power for performing the searches, network traffic for submitting the searches, receiving corresponding responses and communicating with potential subject matter experts).

Embodiments of the present disclosure generally relate to the field of information technology, and more particularly to a method, system and computer program product for determining subject matter experts. Specifically, the following described exemplary embodiments provide a method, system, and computer program product to, among other things, search for a subject matter expert rapidly and efficiently based on a pattern of user's interactions with the computer. Therefore, the present embodiment has the capacity to improve the technical field of information technology by, at a minimum, significantly reducing the number of searches for information required to complete a task and corresponding subject matter experts, and significantly decreasing the number of communications performed over the Internet with other users that are not suitable subject matter experts. As a result of decreasing the number of searches and the number of communications with inappropriate subject matter experts, usage of computing resources is optimized while increasing user's productivity. More specifically, the usage of computing resources is optimized by at least reducing the amount of computational power for performing the searches, decreasing network traffic for submitting the searches, limiting the volume of responses received and the communication with the other users (inappropriate subject matter experts).

Additionally, embodiments of the present disclosure extend a subject matter expert search to all available users based on a criteria that is objective and homogenous. As such, the probability that the subject matter expert is capable of providing the required help to the user is high. The user is promptly informed that he/she may need the support of a subject matter expert. This limits the time during which the user is not capable of performing the required activity in a satisfactory manner and the time that is spent searching for the required information.

Referring now to FIGS. 1A-1D, an illustration of a method for determining subject matter experts based on activities performed on a computer machine are shown, according to an embodiment of the present disclosure.

Figure 1A:
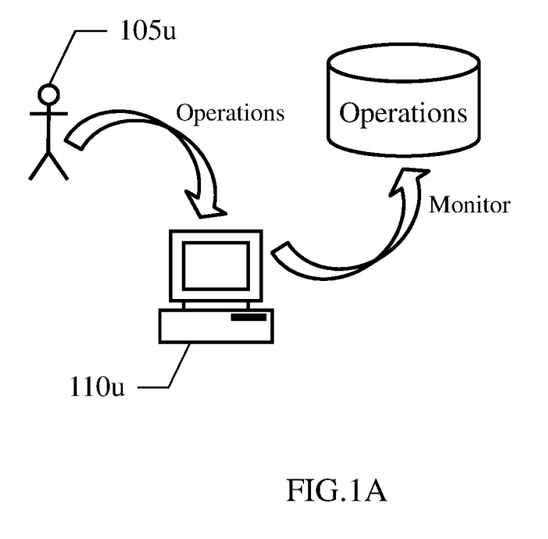
FIGS. 1A-1D illustrate a method for determining experts based on activities performed on a computer machine, according to an embodiment of the present disclosure.

According to FIG. 1A, a user 105$u$ works on a computer 110$u$. Activities of the user 105$u$ on the computer 110$u$ are continuously monitored. Each activity includes a sequence of operations that are performed by the user 105$u$ on the computer 110$u$ during a period of time (for example, entering data/commands with a keyboard, performing actions with a mouse, etc.).

Figure 1B:
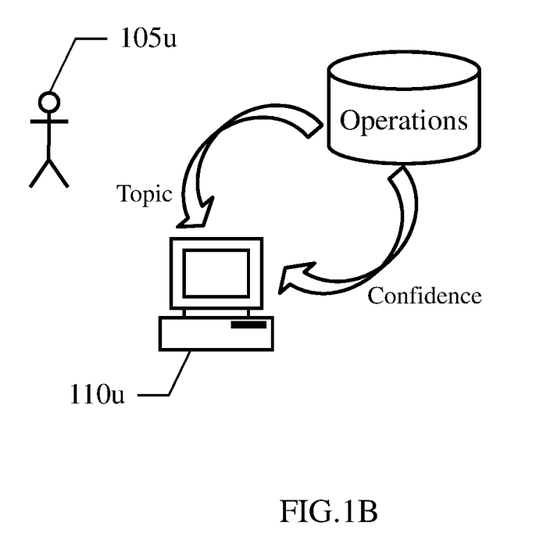

In FIG. 1B, a topic of each activity is determined according to the corresponding operations. For example, in an embodiment, the topic is determined by applying cognitive techniques to the operations of the activity. A confidence indicator is calculated for each activity according to the corresponding operations. The confidence indicator is indicative of a confidence of the user 105$u$ in performing the activity. For example, the confidence indicator is based on how many times the user 105$u$ deletes data that have been previously entered or searches for information related to the activity on the Internet. Stated differently, the confidence indicator is associated with a hesitation pattern of the user during execution of the activity.

Figure 1C:
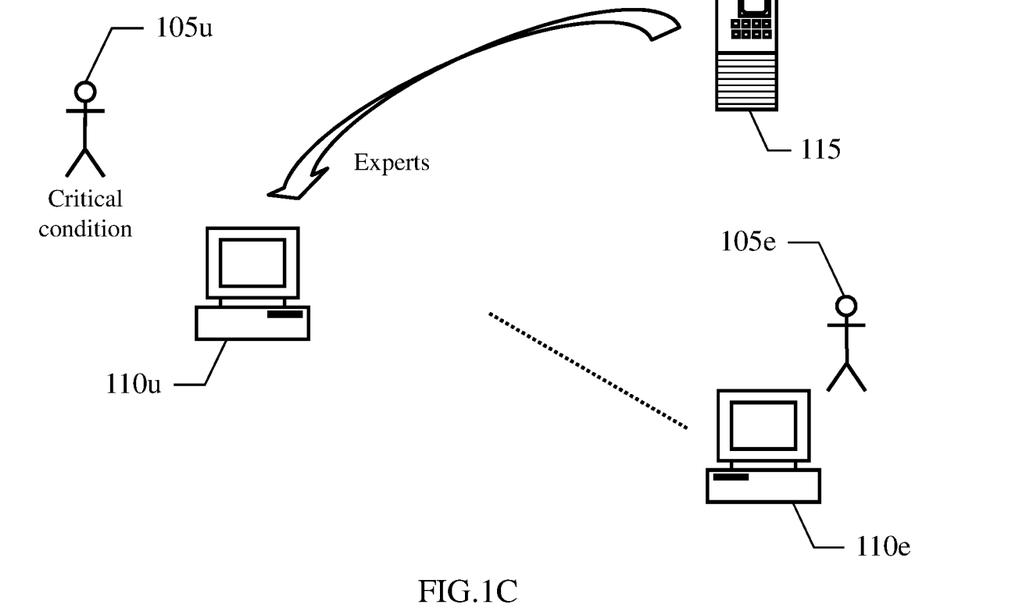

In FIG. 1C, a critical condition of the user 105$u$ is detected. Specifically, the critical condition is detected for a (critical) topic of a (critical) activity according to the corresponding confidence indicator. For example, when the confidence indicator shows that the user 105$u$ is highly indecisive (e.g., the user has repeatedly entered and deleted data and/or has repeatedly searched for information related to the activity on the Internet), one or more subject matter experts for the critical topic are determined. The subject matter experts are determined among other users 105$e$ working on additional computer machines (for example, other computers 110$e$) according to the confidence indicators of the users 105$u$, 105$e$ for the critical topic. For example, for each user 105$u$, 105$e$ an expertise indicator is calculated for each topic according to the corresponding confidence indicators. The expertise indicator is indicative of an expertise of the users 105$u$, 105$e$ on the critical topic. Stated differently, the expertise indicator is associated with a knowledge of any of the users 105$u$, 105$e$ on the (critical) topic. The subject matter experts are then determined according to the expertise indicators for the critical topic of the users 105$u$, 105$e$. A central computer machine may perform this operation, for example, a server 115 that collects the expertise indicators of the users 105$u$, 105$e$ from their respective computers 110$u$, 110$e$.

Figure 1D:
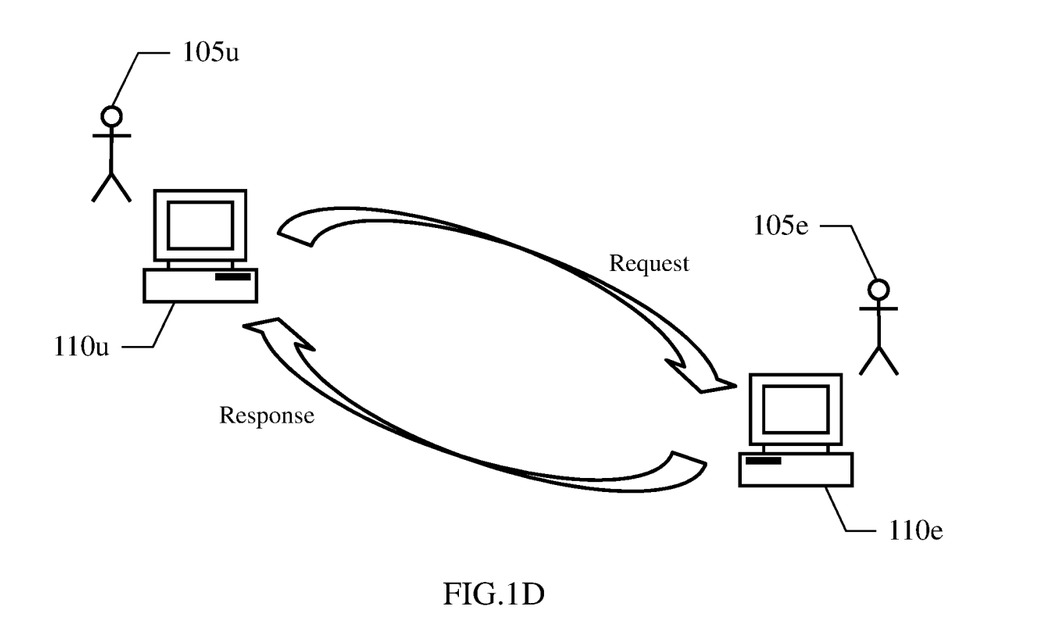

As shown in FIG. 1D, the user 105$u$ is prompted to enter a support request for the critical activity to a selected subject matter expert 105$e$. It should be noted that the support request may be issued to one or more subject matter experts 105$e$. The support request is then submitted to the computer 110$e$ associated with the subject matter expert 105$e$ (which normally returns a corresponding response to the computer 110$u$ of the user 105$u$).

Figure 2:
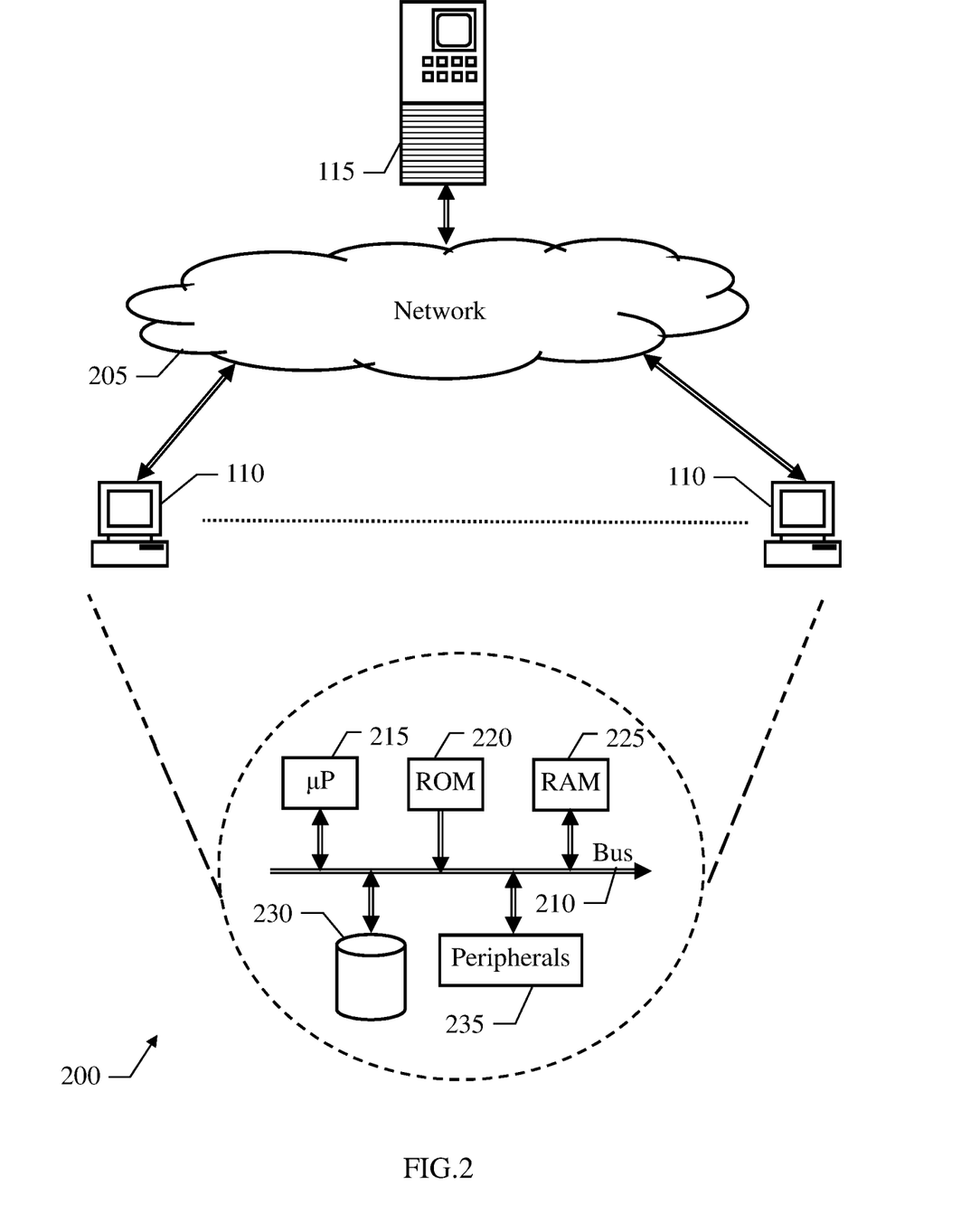
FIG. 2 shows a schematic block diagram of a computing system for determining experts based on activities performed on a computer machine, according to an embodiment of the present disclosure.

Referring now to FIG. 2, a schematic block diagram of a computing system 200 is shown according to an embodiment of the present disclosure.

The computing system 200 includes the computers of all the users, generically denoted with the reference 110, and the server 115. The computers 110 and the server 115 communicate among them via a network 205 (for example, of global type like the Internet).

Each of the above-mentioned computing machines (computers 110 and server 115) includes several units that are connected among them through a bus structure 210 with one or more levels (with an architecture that is suitably scaled according to the type of the computing machine 110,115). Particularly, one or more microprocessors (μP) 215 control operation of the computing machine 110,115. A non-volatile memory (ROM) 220 stores basic code for a bootstrap of the computing machine 110,115 and a volatile memory (RAM) 225 is used as a working memory by the microprocessors 215. The computing machine 110,115 is provided with a mass-memory 230 for storing programs and data, for example, hard disks for the computers 110 and storage devices of a data center where the server 115 is implemented. Moreover, the computing machine 110,115 includes a number of controllers for peripherals, or Input/Output (I/O) units, 235. For example, the peripherals 235 of each computer 110 include a keyboard, a mouse, a monitor, a network adapter (NIC) for connecting to the network 205 and a drive for reading/writing removable storage units (such as optical disks, like DVDs), whereas the peripherals 235 of the server 115 include a network adapter for plugging the server 115 into the data center and then connecting it to a console of the data center (for example, a personal computer, also provided with a similar drive for reading/ writing removable storage units) and to a switch/router sub-system of the data center for its access to the network 205.

Figure 3:
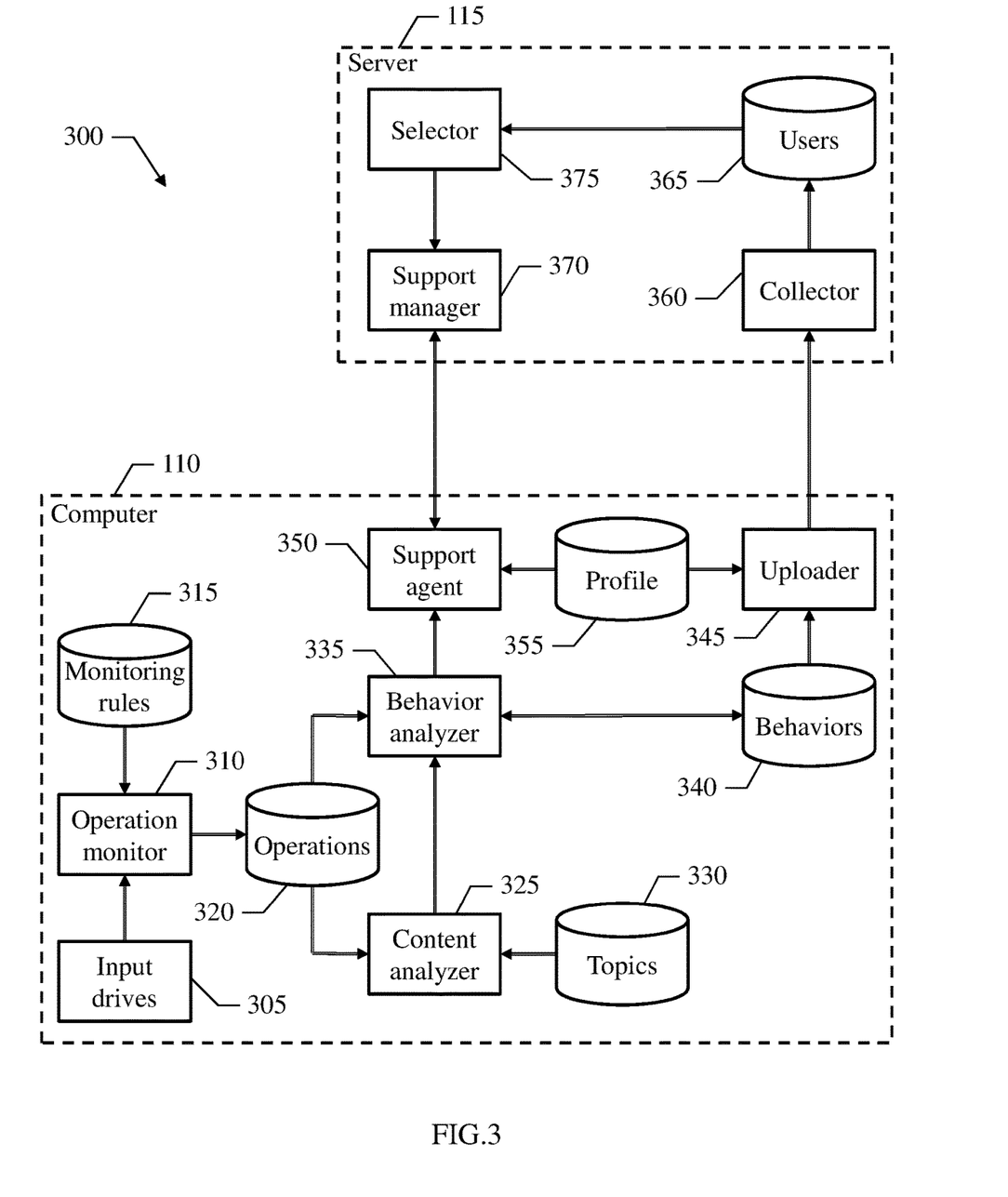
FIG. 3 shows software components used to implement the method, according to an embodiment of the present disclosure.

Referring now to FIG. 3, software components used to determine subject matter experts are shown, according to an embodiment of the present disclosure.

In the figure, all the software components (programs and data) are denoted as a whole with the reference 300. The software components are typically stored in a mass memory (not shown) and loaded (at least in part) into a working memory of the computers 110 and the server 115 when the programs are running, together with corresponding operating systems and other application programs (not shown in the figure). The programs are initially installed into the mass memory, for example, from removable storage units or from the network. In this respect, each program may be a module, segment or portion of code, which includes one or more executable instructions for implementing the specified logical function.

Each computer 110 (only one shown in the figure) includes the following software components: one or more input drives 305 of the computer 110 that are used to input data/commands by the corresponding user (for example, the keyboard and the mouse). An operation monitor 310 monitors the operations that are performed by the user on the computer 110. For this purpose, the operation monitor 310 uses the input drives 305. The operation monitor 310 accesses (in read mode) a monitoring rule repository 315, which stores monitoring rules for the operations to be monitored. Particularly, the monitoring rule repository 315 lists (relevant) software applications corresponding to activities to be monitored (for example, word processor, spreadsheet, slideshow, CAD and IDE applications); for each software application, the monitoring rule repository 315 indicates (relevant) operations to be monitored (for example, typing of keys, pressing of buttons, selection of menu items) and how they are used to determine the confidence indicator of each activity (for example, number of entered characters, number of deleted characters, number of searches for the corresponding topic). The operation monitor 310 accesses (in write mode) an operation log 320, which logs the operations of a current activity that is in progress.

A content analyzer 325 analyzes a content of each activity to determine its topic. The content analyzer 325 accesses (in read mode) the operation log 320. The content analyzer 325 accesses (in read mode) a topic repository 330, which stores information about all possible topics. Particularly, the topic repository 330 lists known topics (for example, programming languages, hardware architectures, business fields, etc.). For each topic, indicated by a corresponding unique identifier, the topic repository 330 includes recognition information such as behavior patterns, keywords etc. A behavior analyzer 335 analyzes a behavior of the user to determine the confidence indicator for each activity and the expertise indicator for each topic. The behavior analyzer 335 uses the content analyzer 325 and it accesses (in read/write mode) a behavior repository 340, which stores information about the behavior of the user, to determine the confidence indicator. Particularly, the behavior repository 340 includes an entry for each topic (indicated by its identifier) on which the user has performed any activity. The entry includes the expertise indicator for the topic. Moreover, the entry includes a FIFO queue with records (for example, 100-500) for the most recent activities that have been performed by the user on the topic. In turn, each record includes the confidence indicator for the activity, a recording time of the confidence indicator, a duration of the activity and a productivity rate of the user while performing the activity.

An uploader 345 uploads information about the user to the server 115. For this purpose, the uploader 345 accesses (in read mode) the behavior repository 340. The behavior analyzer 335 controls a support agent 350, which manages interactions of the user with the subject matter experts that may support him/her in the critical activities. Both the uploader 345 and the support agent 350 accesses (in read mode) a profile repository 355, which stores a profile of the user. Particularly, the profile includes user's personal information (for example, name, education, job, e-mail address, etc.) and one or more filtering criteria for the subject matter experts (for example, white/black lists of users, companies, etc.).

With continued reference to FIG. 3, the server 115 includes the following software components: a collector 360 collecting information about all the users. For this purpose, the collector 360 interacts with the uploader 345 of all the computers 110. The collector 360 accesses (in write mode) a user repository 365, which stores the collected information about the users. Particularly, the user repository 365 includes an entry for each user (indicated by a corresponding unique identifier, such as his/her e-mail address). The entry includes the user's personal information and all its expertise indicators for corresponding topics indicated by their identifiers. A support manager 370 manages the requests for subject matter experts submitted to the server 115 by all the computers 110 (when the corresponding users are in critical conditions). For this purpose, the support manager 370 interacts with the support agent 350 of all the computers 110. Moreover, the support manager 370 uses a selector 375, which selects the subject matter experts (among all the users) for each critical condition of each user. For this purpose, the selector 370 accesses (in read mode) the user repository 365.

Figure 4A:
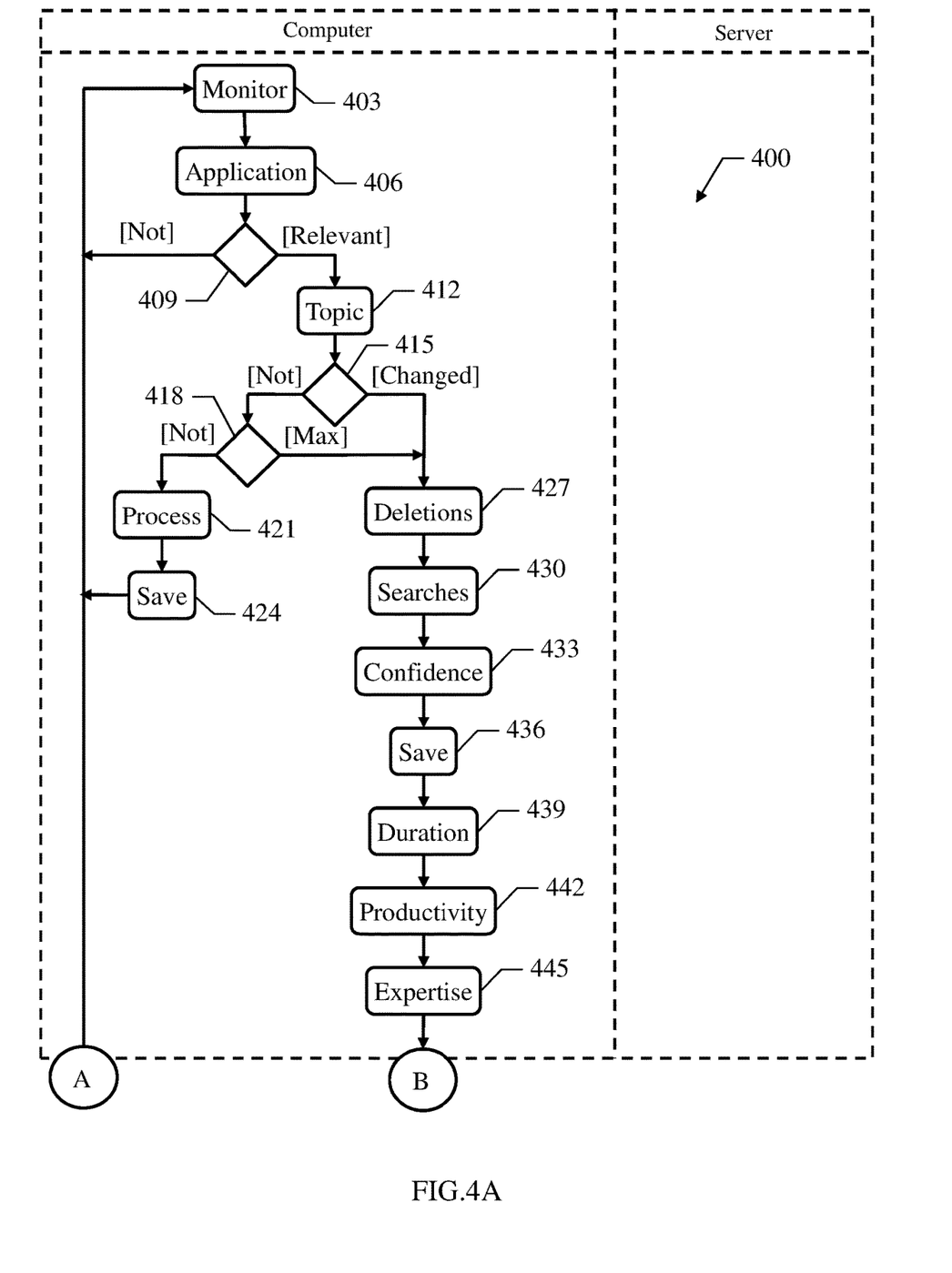
FIGS. 4A-4B show an activity diagram describing activities associated with an implementation of the method, according to an embodiment of the present disclosure.
Figure 4B:
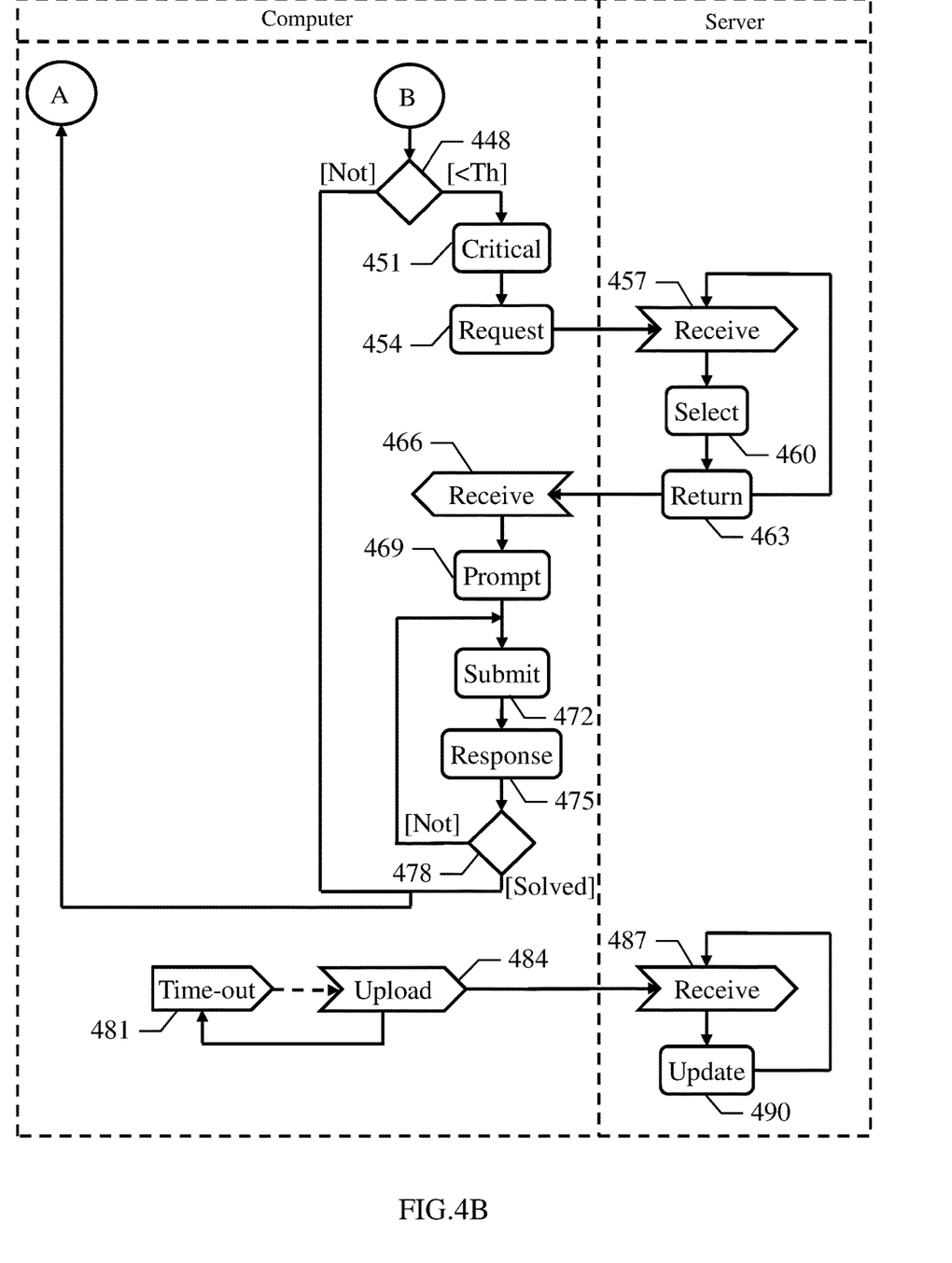

Referring now to FIGS. 4A-4B, an activity diagram describing the steps of a method 400 for determining subject matter experts is shown, according to an embodiment of the present disclosure.

Specifically, the diagram represents an exemplary process that used to support a user of a generic computer by implementing the method 400. In this embodiment, each block corresponds to one or more executable instructions for implementing the specified logical function on the corresponding computing machine (computers and server).

Starting from the swim-lane of the computer, a loop is continually executed to monitor activities performed by the user on the computer. The loop begins at block 403, where the operation monitor detects a current operation performed by the user on the computer (for example, by using hooking techniques). The operation monitor at block 406 determines the (current) software application in which the operation is performed. According to an embodiment, the software application is determined based on a window focus on the computer's monitor (i.e., the window that is selected at the moment for receiving input). The operation monitor at block 409 verifies the software application against a monitoring rule repository (e.g., monitoring rule repository 315 in FIG. 3) which is maintained up-to-date by the server. If the software application is not listed in the monitoring rule repository, it is not relevant for the monitoring. In this case, the process returns to the block 403 directly without performing any action. Therefore, corresponding non-relevant operations are discarded, this allows avoiding monitoring operations that may be performed sporadically during an actual activity to be monitored (for example, reading e-mails, responding to instant messages). This reduces consumption of computing resources without adversely affecting the quality of the obtained results.

Conversely, if the software application is listed in the monitoring rule repository, it is relevant for the monitoring. In this case, a topic analyzer at block 412 determines a (current) topic in which the user is working. The topic is determined according to the corresponding operations that have been performed by the user (after a transient period required to have a significant number in the operation log, such as 10-50). For example, the topic is determined among the ones indicated in a topic repository (e.g., topic repository 330 in FIG. 3) according to the most recent operations that have been performed by the user (for example, the last 10-100 retrieved from the operation log) by applying cognitive techniques. It should be noted that the topic repository is maintained up-to-date by the server. The process branches at block 415 according to the topic. If the topic has not changed (with respect to the topic determined at a previous iteration of the loop, as indicated in a corresponding variable initially empty), the operation monitor at block 418 verifies a duration of the (current) activity in which the user is working (equal to the time elapsed from its start time, as indicated in a corresponding variable).

If the duration of the activity is lower than a maximum value (for example, 10-20 minutes) the operation monitor at block 421 processes the operation according to the monitor rules from the corresponding repository. Particularly, the operation monitor increments an operation counter (initialized to zero at the beginning). The operation monitor determines whether the operation is relevant for the monitoring, and if so how it has to be used. For example, an entering counter is incremented when a character has been entered, a deletion counter is incremented when a character has been deleted and a search counter is incremented when a search has been performed for the same topic. It should be noted that entering/deletion/search counters are initialized to zero at the beginning of the operation. If the operation is relevant, the operation monitor at block 424 saves the operation into the operation log. The flow of activity then returns to the block 403 to repeat the same operations continually.

The process instead descends into block 427 from the block 415 if the topic has changed or from the block 418 if the duration of the activity is higher than the maximum value. In both cases, the monitoring of the activity is completed. At this point, a behavior analyzer (such as behavior analyzer 335 in FIG. 3) at block 427 calculates a deletion rate according to any deletions that have been performed. According to an embodiment, the deletion rate is set to the deletion counter divided by the operation counter and multiplied by a scaling factor (so as to range from 0 to 1). The behavior analyzer at block 430 calculates a search rate according to any searches that have been performed for the topic. According to an embodiment, the search rate is set to the search counter multiplied by a scaling factor (so as to range from 0 to 1). Both the deletion rate and the search rate are indicative of an indecision (or hesitation) of the user in performing the activity (the higher the deletion and search rate the higher the hesitation of the user regarding the operation). The behavior analyzer at block 433 calculates a confidence indicator for the activity according to the deletion rate and the search rate. For example, the confidence indicator is set to 1 minus the sum of the deletion rate and the search rate multiplied by a scaling factor (so as to range from 0 to 1, where the higher the confidence indicator the higher the confidence of the user performing the activity). The behavior analyzer at block 436 updates a behavior repository (such as behavior repository 340 in FIG. 3) accordingly. Particularly, if no entry for the topic exists (since the user has never worked on it before), a (new) entry is added for the topic. In any case, the duration of the activity is calculated as the current time minus its start time, and a productivity rate of the activity is calculated as the difference between the entering counter and the deletion counter, divided by the operation counter and multiplied by a scaling factor (so as to range from 0 to 1). The behavior analyzer shifts the records of the corresponding queue forwards (possibly losing the oldest one) and then inserts the confidence indicator, the recording time of the confidence indicator (set to the current time), the duration of the activity and the productivity rate of the activity into the first record of the queue.

The behavior analyzer at block 439 calculates a relative activity duration for the topic. For example, a specific activity duration is calculated as the sum of the durations of the activities that have been performed on the topic (retrieved from the queue of the corresponding entry in the behavior repository) and a total activity duration is calculated as the sum of the duration of the activities that have been performed on all the topics (retrieved from the queues of all the entries in the behavior repository). The relative activity duration is set to the specific activity duration divided by the total activity duration and multiplied by a scaling factor (so as to range from 0 to 1). The relative activity duration is then indicative of how often the user has worked on the topic. The behavior analyzer at block 442 calculates a productivity indicator for the topic indicative of a productivity of the user. According to an embodiment, the productivity indicator is set to an average of the productivity rates of the activities that have been performed on the topic weighted according to their recording times, where the older the recording times the lower the weights (retrieved from the queue of the corresponding entry in the behavior repository). The behavior analyzer at block 445 calculates the expertise indicator for the topic according to the corresponding confidence indicators, relative activity duration and productivity indicator. For example, the expertise indicator is set to the productivity indicator multiplied by the relative activity duration plus the average of the confidence indicators weighted according to their recording times, where the older the recording times the lower the weights (retrieved from the queue of the corresponding entry in the behavior repository). In this way, the expertise indicator increases with the productivity, the time spent and the confidence of the user in working on the topic. The behavior analyzer then saves the expertise indicator into the corresponding entry of the behavior repository (by replacing its previous value).

The flow of activity now branches at block 448 according to the confidence indicator of the activity. If the confidence indicator is lower than a confidence threshold (for example, 0.3-0.5) the process descends into block 451. In this case, the user has shown a low confidence in performing the activity (i.e., with many indecisions as indicated by corresponding deletion operations and/or searches on the topic). It is then likely that the user needs the support of an expert on the topic. Therefore, after a manual confirmation by the user, the behavior analyzer detects a critical condition of the (critical) user for the (critical) topic of the (critical) activity. In response to detecting the critical condition, a support agent at block 454 submits a corresponding selection request to the server for subject matter experts that may support the user. The selection request includes the identifier of the critical user, the identifier of the critical topic and an applicable filtering criteria, if any (retrieved from a profile repository, such as the profile repository 355 in FIG. 3).

Moving to the swim-lane of the server, a selector at block 457 receives any selection request that has been submitted by the computer of any critical user. In response to the selection request, the selector at block 460 selects one or more of the other users as subject matter experts for supporting the critical user (in the critical condition). The subject matter experts are selected according to the expertise indicators for the critical topic of the users (as indicated in a user repository, such as the user repository 365 of FIG. 3). For example, all the other users meeting the filtering criteria and whose expertise indicators for the critical topic are (strictly) higher than the expertise indicator for the critical topic of the critical user. The subject matter experts are then determined among these users in decreasing order of their expertise indicators, up to a maximum number (for example, the first 5-10). The selector at block 463 returns a corresponding selection response to the computer of the critical user. The selection response lists the subject matter experts that have been determined, each one with his/her personal information and expertise indicator for the critical topic (retrieved from the user repository). The process then returns to the block 457 to wait for the next selection request.

Referring back to the swim-lane of the computer of the (critical) user, a support agent receives the selection response at block 466. In response to receiving the selection response, the support agent at block 469 prompts the user to enter a support request for the critical topic and to select one or more of the subject matter experts. After that, the support agent at block 472 submits the support request to the computer of the (selected) subject matter expert(s) as indicated by his/her contact in the selection response. Assuming that the selected subject matter expert(s) responds to the support request, the support agent at block 475 receives a corresponding support response from the corresponding computer. The flow of activity branches at block 478 according to a status of the critical condition (as indicated manually by the user). If the critical condition has not yet been solved, the process returns to the block 472 to reiterate the same operations. The process instead returns to the block 403 from the block 478 (once the critical condition has been solved or the user has decided to proceed differently) or directly from the block 448 (if the confidence indicator is higher than the confidence threshold indicating that the user is not in a critical condition). The operation monitor than begins monitoring a new activity (starting from the last operation that has been monitored when the topic has changed), by resetting all the corresponding variables/counters.

In a completely independent way, the process passes from block 481 to block 484 in the swim-lane of the computer as soon as an uploading time-out expires (for example, every 15-60 days). In response thereto, the uploader determines the personal information (in the profile repository) and the expertise indicators (in the behavior repository) that have changed since a last verification. If necessary, the uploader uploads the updated personal information and expertise indicators to the server (provided that the user has given a corresponding authorization). The process then returns to the block 481 to repeat the same operations periodically. Therefore, these operations are performed occasionally (and possibly during off-peak times) so that their impact on the performance of the computing system is negligible. In any case, this does not adversely affect the quality of the obtained results, since the personal information and the expertise indicators have a very low dynamics. Moving to the swim-lane of the server, the collector at block 487 receives any personal information and/or expertise indicators that have been uploaded by the computer of any user. In response thereto, the collector at block 490 updates the user repository accordingly. The process then returns to the block 487 to wait for a next upload.

Therefore, embodiments of the present disclosure provide a method, system, and computer program product to identify when a user performing activities on a computer (laptop, mobile phone, etc.) requires help from a subject matter expert (SME) and to identify an available SME capable of helping the user performing the activities. According to an embodiment, a computer activity monitoring engine monitors user activity by recognizing hesitation patterns like many entry cancelling on the computer keyboard or rephrasing many times on the same working item or identifying searches done by the user during his/her activity about the content over the Internet. Moreover, a computer subject identification engine, simultaneously to the monitoring above, analyzes the content of the windows that have the focus on the computer, using a Cognitive service (like Watson Cognitive Service) to identify the topic in which the user is working on. Finally, a computer indexer engine correlates the information coming from the activity monitoring engine and the subject identification engine to rank the expertise of the user on that specific topic by computing a SME index associated to the user, in which:

$$SMEIndex = K*E, \text{ where:}$$

E: expertise in the observer timeframe=$a*(A/TA)-b*B-c*C$ (the lower-case letters are some scale factors depending from the importance of each element.)

K: productivity scale factor

And where:

A: number of time spent on that specific topic

TA: total work time

B: hesitation rate

C: web search rate

The SME verifies where the user lands on an expertise ranked list according to the value of his/her SMEIndex and proposes a possible list of people that have at a minimum a higher SMEIndex, with an index sufficient to help the current user.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. On the other hand, each item presented in a group is not to be construed as a de facto equivalent of any other item of the same list solely based on their common presentation without indications to the contrary (but they are individually identified as separate and unique items); likewise, different embodiments, examples or alternatives are not to be construed as a de facto equivalent of one another (but they are separate and autonomous representations of the present disclosure). In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, include, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for supporting users of user computing machines (with the method that includes the following steps for each of the user computing machines). However, the users may be in any number and of any type (for example, programmers, accountants, writers and so on) and they may work on any user computing machines.

In an embodiment, the method includes monitoring (by the user computing machine) a plurality of activities. However, the activities may be in any number and of any type (for example, partial, different or additional activities with respect to the ones mentioned above).

In an embodiment, each activity includes a sequence of operations that are performed by the corresponding user on the user computing machine during a corresponding period. However, the operations may be of any type (for example, only relevant operations of any type or all the performed ones); moreover, each activity may be monitored during any period (for example, with a maximum duration or up to its completion).

In an embodiment, the method includes determining (by the user computing machine) corresponding topics of the activities according to the corresponding operations. However, the topics may be of any type (for example, only known topics or without any restriction) and they may be determined in any way (for example, with cognitive, artificial intelligence, fuzzy logic techniques, either locally or online) according to the corresponding operations (for example, only the most recent ones in any number or even all of them).

In an embodiment, the method includes calculating (by the user computing machine) corresponding confidence indicators that are indicative of a confidence of the user for the activities. However, the confidence indicators may be of any type (for example, defined by continuous values or discrete levels, increasing or decreasing with the confidence).

In an embodiment, each confidence indicator is calculated according to the corresponding operations. However, the confidence indicator may be calculated in any way (for example, according to the deletion operations, the searches on the corresponding topic or any combination thereof).

In an embodiment, the method includes detecting (by the user computing machine) a critical condition of the user (for a critical one of the topics of a critical one of the activities). However, the critical condition may be detected in any way (for example, requesting a manual confirmation or automatically).

In an embodiment, the critical condition is detected according to the corresponding confidence indicator. However, the critical condition may be detected in any way according to the confidence indicator (for example, by comparing the confidence indicator with any confidence threshold, as soon as it reaches the confidence threshold or only after this persists for two or more verifications).

In an embodiment, the method includes determining (by the user computing machine) one or more subject matter experts for the critical topic in response to the critical condition. However, the subject matter experts may be in any number and they may be determined in any way (for example, by submitting a corresponding request remotely or by the user computing machine locally).

In an embodiment, the subject matter experts are determined among other ones of the users of other ones of the user computing machines. However, the subject matter experts may be determined among any other users (for example, limited according to any filtering criteria or indiscriminately).

In an embodiment, the subject matter experts are determined according to the confidence indicators for the critical topic of the users. However, the subject matter experts may be determined in any way according to the confidence indicators of the users (for example, by calculating any corresponding expertise indicators or even directly).

In an embodiment, the method includes prompting (by the user computing machine) the user to enter a support request for the critical activity. However, the user may be prompted in any way (for example, simply requesting him/her to enter the support request or by suggesting its content too).

In an embodiment, the support request is addressed to selected one or more of the subject matter experts. However, the selected subject matter experts may be in any number (up to all) and they may be selected in any way (for example, manually or automatically).

In an embodiment, the method includes submitting (by the user computing machine) the support request to the user computing machines of the selected subject matter experts. However, the support request may be submitted in any way (for example, via e-mail, instant message, post).

In an embodiment, the method includes calculating (by the user computing machine) each of the confidence indicators according to any deletion ones of the corresponding operations. However, the deletion operations may be of any type (for example, deletions of characters, words, phrases) and they may be used in any way to calculate the confidence indicator (for example, alone or combined in any way with any other number and type of values).

In an embodiment, the method includes calculating (by the user computing machine) each of the confidence indicators according to any searches on the corresponding topic of the corresponding operations. However, the searches may be of any type (for example, in any search engines, databases, help functions of software applications, either online or locally) and they may be used in any way to calculate the confidence indicator (for example, alone or combined in any way with any other number and type of values).

In an embodiment, the method includes calculating (by the user computing machine) corresponding expertise indicators that are indicative of an expertise of the user for the topics. However, the expertise indicators may be of any type (for example, defined by continuous values or discrete levels, increasing or decreasing with the expertise).

In an embodiment, each expertise indicator is calculated according to a plurality of the corresponding confidence indicators. However, the expertise indicator may be calculated in any way (for example, according to the confidence indicators only or combined in any way with any other number and type of values), as a function in any way of the corresponding confidence indicators (for example, only the ones of the most recent activities in any number or even all of them, weighted according to their recording times or independently thereof).

In an embodiment, the method includes determining (by the user computing machine) the subject matter experts according to the expertise indicators for the critical topic of the users. However, the subject matter experts may be determined in any way according to the expertise indicators (for example, by selecting the subject matter experts only among the other users whose expertise indicator is higher than the expertise indicator of the user, in a predefined number or until their expertise indicator is higher by a threshold, such as 10-20%, of the expertise indicator of the user, or even indiscriminately).

In an embodiment, the method includes calculating (by the user computing machine) a relative activity duration for each of the topics according to a comparison between a specific activity duration of the activities of the topic and a total activity duration of the activities of all the topics. However, the activity durations may be calculated in any way (for example, taking into account only the most recent activities in any number or even all of them), as a function in any way of the durations of the corresponding activities (for example, weighted according to their recording times or independently thereof); moreover, the relative activity duration may be calculated according to any comparison between the specific activity duration and the total activity duration (for example, as their ratio, difference, either scaled or as is).

In an embodiment, the method includes calculating (by the user computing machine) the expertise indicator for each of the topics according to the corresponding relative activity duration. However, the expertise indicator may be calculated in any way according to the relative activity duration (for example, with any linear or non-linear function).

In an embodiment, the method includes calculating (by the user computing machine) a productivity indicator for each of the topics that is indicative of a productivity of the user on the topic. However, the productivity indicator may be of any type (for example, defined by continuous values or discrete levels, increasing or decreasing with the productivity).

In an embodiment, the productivity indicator is calculated according to a comparison between productive ones of the operations for the topic and all the operations for the topic. However, the productive operations may be of any type (for example, writing of characters, words, phrases, functions, program instructions) and they may be compared in any way with all the operations to calculate the productivity indicator (for example, according to their number or duration, as their ratio, difference, either scaled or as is).

In an embodiment, the method includes calculating (by the user computing machine) the expertise indicator for each of the topics according to the corresponding productivity indicator. However, the expertise indicator may be calculated in any way according to the productivity indicator (for example, with any linear or non-linear function).

In an embodiment, the method includes calculating (by the user computing machine) the expertise indicator for each of the topics according to the plurality of corresponding confidence indicators that are weighted according to recording times thereof. However, the confidence indicators may be weighted in any way according to their recording times (for example, with any linear or non-linear function).

In an embodiment, the method includes uploading (by the user computing machine) the expertise indicators of the user to a central computing machine. However, the expertise indicators may be uploaded in any way (for example, periodically or upon request) to any central computing machine.

In an embodiment, the method includes submitting (by the user computing machine) a selection request for the critical topic to the central computing machine in response to the critical condition. However, the selection request may be of any type (for example, indicating the critical topic with or without any additional information) and it may be submitted in any way (for example, as a message, a remote command).

In an embodiment, this causes the central computing machine to select the subject matter experts among the other users according to the expertise indicators of the users. However, the subject matter experts may be selected in any number and in any way.

In an embodiment, the method includes receiving (by the user computing machine) an indication of the subject matter experts from the central computing machine. However, the indication of the subject matter experts may be of any type (for example, their contacts with or without any additional information) and it may be received in any way (for example, embedded in a message, with corresponding links).

In an embodiment, the method includes monitoring (by the user computing machine) each of the activities up to a change of the corresponding topic or to a reaching of a maximum duration. However, the maximum duration may have any value (for example, fixed or variable, depending on the topics or the same for all of them).

In an embodiment, the method includes monitoring (by the user computing machine) the activities by discarding non-relevant ones of the operations being not relevant for the corresponding topics. However, the non-relevant operations may be of any type (for example, partial, different or additional non-relevant operations with respect to the ones mentioned above) and they may be discarded in any way (for example, completely or only for the determination of the topic or for the calculation of the confidence indicator).

In an embodiment, the method includes determining (by the user computing machine) the subject matter experts for the critical topic according to one or more filtering criteria of the user. However, the filtering criteria may be in any number (down to none) and of any type (for example, partial, different or additional filtering criteria with respect to the ones mentioned above).

In an embodiment, the method includes determining by the user computing machine the topics of the activities with a cognitive technique. However, the cognitive technique may be of any type (for example, based on artificial intelligence, machine learning, reasoning, natural language, semantic analysis processing or any combination thereof).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program configured for causing a user computing machine to perform the above-described method when the computer program is executed on the user computing machine. An embodiment provides a computer program product that includes a computer readable storage medium having program instructions embodied therewith; the program instructions are executable by a user computing machine to cause the user computing machine to perform the same method. However, the computer program may be implemented as a stand-alone module, as a plug-in for a pre-existing software program (for example, any software application), or even directly in the latter. Moreover, the computer program may be executed on any user computing machine.

An embodiment provides a system comprising means that are configured for performing each of the steps of the above-described method. An embodiment provides a system comprising a circuit (i.e., any hardware suitably configured, for example, by software) for performing each of the steps of the same method. However, the system may be of any type (for example, each user computing machine alone, the central computing system alone, the central computing system with the user computing machines communicating among them via any local, wide area, global, cellular or satellite network and exploiting any type of wired and/or wireless connections); moreover, each user computing machine and the central computing machine may be of any type (for example, a desktop, a laptop, a tablet, a smartphone, a server) and they may be implemented by any physical machine, virtual machine or a static or dynamic combination thereof (for example, in a cloud environment). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

Generally, similar considerations apply if the system has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining subject matter experts, the method comprising:
   monitoring, by a computer, an activity performed by a user during a period of time, the activity comprising a sequence of operations;
   based on the sequence of operations, determining a topic of the activity performed by the user;
   recognizing, by the computer, a hesitation pattern of the user associated with the topic during the period of time;
   based on the recognized hesitation pattern, calculating a confidence indicator associated with the activity, the confidence indicator specifies a confidence of the user in performing the activity;
   based on the confidence indicator being lower than a confidence threshold, identifying one or more subject matter experts for the determined topic; and
   prompting the user to submit a support request to at least one of the identified subject matter experts.

2. The method of claim 1, further comprising:
   based on a monitoring rule repository, identifying a software application in which the sequence of operations is currently being executed.

3. The method of claim 2, wherein the software application is identified based on a window focus on a monitor of the computer.

4. The method of claim 1, wherein the topic is determined according to a topic repository and most recent operations within the sequence of operations using cognitive techniques.

5. The method of claim 1, wherein recognizing, by the computer, the hesitation pattern comprises:
   determining a deletion rate and a search rate associated with the topic during the period of time.

6. The method of claim 5, wherein the confidence indicator is set to one minus the sum of the deletion rate and the search rate multiplied by a first scaling factor ranging from 0 to 1, wherein the higher the confidence indicator the higher the confidence of the user in performing the activity.

7. The method of claim 1, further comprising:
   in response to a change of topic, completing the monitoring of the activity; and
   starting to monitor a new activity.

8. The method of claim 1, further comprising:
   in response to a duration of the activity exceeding a maximum value, completing the monitoring of the activity; and
   starting to monitor a new activity.

9. The method of claim 1, further comprising:
   calculating a relative activity duration for the topic, the relative activity duration indicates how often the user has worked on the topic, wherein the relative activity duration is set to a specific activity duration divided by a total activity duration multiplied by a second scaling factor ranging from 0 to 1; and
   calculating a productivity indicator for the topic, the productivity indicator indicates a productivity of the user performing the activity.

10. The method of claim 9, wherein the productivity indicator is set to an average of productivity rates of activities previously performed on the topic weighted according to their corresponding recording times, wherein the older the recording times the lower the weights.

11. The method of claim 9, further comprising:
based on the confidence indicator, relative activity duration, and productivity indicator, calculating an expertise indicator for the topic; and
based on an expertise indicator associated with one or more additional users exceeding the calculated expertise indicator for the topic, selecting the one or more additional users as subject matter experts for the topic.

12. A computer system for determining subject matter experts, the computer system comprising:
one or more processors, one or more non-transitory computer-readable memories, one or more non-transitory computer-readable tangible storage devices, and program instructions stored on at least one of the one or more non-transitory computer-readable tangible storage devices for execution by at least one of the one or more processors via at least one of the one or more non-transitory computer-readable memories, wherein the computer system is capable of performing a method comprising:
monitoring, by a computer, an activity performed by a user during a period of time, the activity comprising a sequence of operations;
based on the sequence of operations, determining a topic of the activity performed by the user;
recognizing, by the computer, a hesitation pattern of the user associated with the topic during the period of time;
based on the recognized hesitation pattern, calculating a confidence indicator associated with the activity, the confidence indicator specifies a confidence of the user in performing the activity;
based on the confidence indicator being lower than a confidence threshold, identifying one or more subject matter experts for the determined topic; and
prompting the user to submit a support request to at least one of the identified subject matter experts.

13. The computer system of claim 12, further comprising:
based on a monitoring rule repository, identifying a software application in which the sequence of operations is currently being executed.

14. The computer system of claim 13, wherein the software application is identified based on a window focus on a monitor of the computer.

15. The computer system of claim 12, wherein the topic is determined according to a topic repository and most recent operations within the sequence of operations using cognitive techniques.

16. The computer system of claim 12, wherein recognizing, by the computer, the hesitation pattern comprises:
determining a deletion rate and a search rate associated with the topic during the period of time.

17. The computer system of claim 16, wherein the confidence indicator is set to one minus the sum of the deletion rate and the search rate multiplied by a first scaling factor ranging from 0 to 1, wherein the higher the confidence indicator the higher the confidence of the user in performing the activity.

18. The computer system of claim 12, further comprising:
calculating a relative activity duration for the topic, the relative activity duration indicates how often the user has worked on the topic, wherein the relative activity duration is set to a specific activity duration divided by a total activity duration multiplied by a second scaling factor ranging from 0 to 1; and
calculating a productivity indicator for the topic, the productivity indicator indicates a productivity of the user performing the activity.

19. The computer system of claim 18, wherein the productivity indicator is set to an average of productivity rates of activities previously performed on the topic weighted according to their corresponding recording times, wherein the older the recording times the lower the weights.

20. The computer system of claim 18, further comprising:
based on the confidence indicator, relative activity duration, and productivity indicator, calculating an expertise indicator for the topic; and
based on an expertise indicator associated with one or more additional users exceeding the calculated expertise indicator for the topic, selecting the one or more additional users as subject matter experts for the topic.

* * * * *